No. 675,971. Patented June 11, 1901.
F. F. RAYMOND, 2d.
PASTE POT OR JAR.
(Application filed Jan. 7, 1901.)
(No Model.) 2 Sheets—Sheet 1.

WITNESSES:
INVENTOR:

No. 675,971. Patented June 11, 1901.
F. F. RAYMOND, 2d.
PASTE POT OR JAR.
(Application filed Jan. 7, 1901.)
(No Model.) 2 Sheets—Sheet 2.

WITNESSES

INVENTOR

UNITED STATES PATENT OFFICE.

FREEBORN F. RAYMOND, 2D, OF NEWTON, MASSACHUSETTS, ASSIGNOR TO THE CARTER'S INK COMPANY, OF BOSTON, MASSACHUSETTS.

PASTE POT OR JAR.

SPECIFICATION forming part of Letters Patent No. 675,971, dated June 11, 1901.

Application filed January 7, 1901. Serial No. 42,384. (No model.)

*To all whom it may concern:*

Be it known that I, FREEBORN F. RAYMOND, 2d, a citizen of the United States, residing at Newton, in the county of Middlesex and State of Massachusetts, have invented a new and useful Improvement in Paste Pots or Jars, of which the following is a full, clear, and exact description, reference being had to the accompanying drawings, forming a part of this specification, in explaining its nature.

The invention is an improvement upon that described in my application for Letters Patent of the United States executed of even date herewith, (Case A;) and it relates to a paste pot or jar made in two parts or sections, one of which holds paste and the other of which holds water, and both of which when combined form a water-holding chamber which may envelop the paste-holder, and which provides the paste-holder with moisture of evaporation and also provides a receptacle for holding and moistening the paste-brush.

I will now describe the invention in connection with the drawings, wherein—

Figure 1:
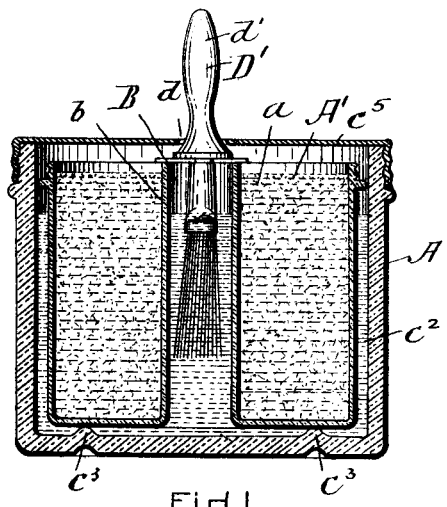
Figure 2:
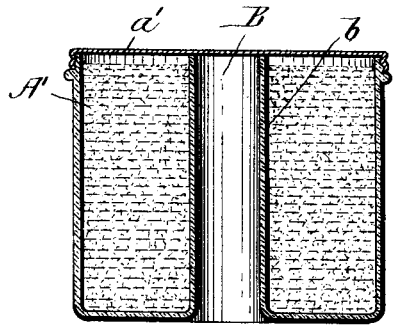
Figure 3:
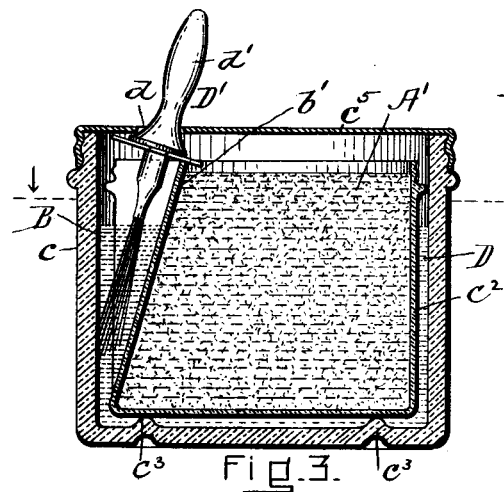
Figure 5:
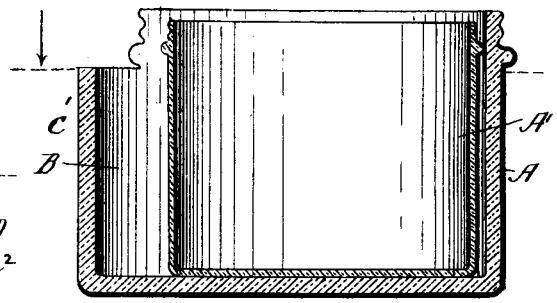
Figure 4:
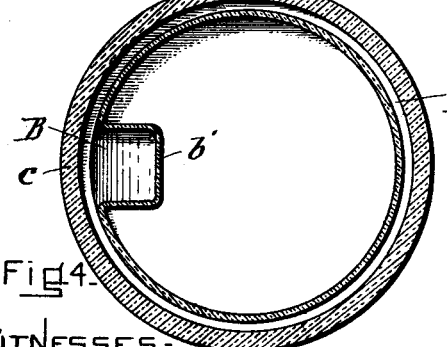
Figure 6:
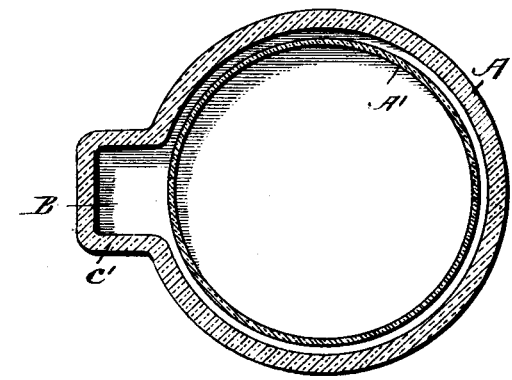
Figure 7:
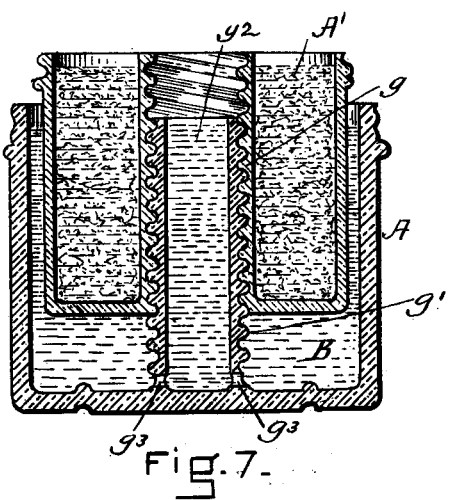
Figure 8:
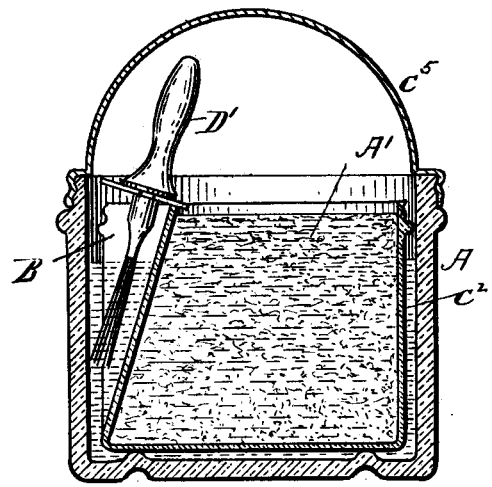

Figure 1 is a view in vertical section of the paste pot or jar. Fig. 2 is a view in vertical section of an independent paste-holder, forming a part of the jar of Fig. 1. Figs. 3 and 4 are views in vertical section and horizontal section, respectively, of a modified form of the invention, representing the paste-chamber as at one side of the jar instead of at the center. Figs. 5 and 6 are also views in vertical and horizontal section, representing another modification in which the brush-holder is provided by an extension of the wall of the jar. Fig. 7 illustrates a further modification in which the means for displacing the water of the evaporating-chamber and of the brush-chamber at will are shown. Fig. 8 shows the jar with an imperforate dome-shaped top for entirely inclosing the brush.

Referring to the drawings, A represents the jar or pot, and A' the paste-holding section or part of the pot. The latter preferably is in the form of a cylindrical vessel made of glass or other suitable material and having a chamber $a$ to contain the paste and which chamber is open at its top and closed at its bottom. This vessel is adapted to be closed by a cover $a'$, which is attachable to it in any desired way. The jar A may also have in it provision for the establishment of a brush water-chamber B or a portion thereof. One way of providing this brush water-chamber is represented in Figs. 1 and 2, where the vessel A' has preferably integral with it a cylindrical wall $b$ within the chamber $a$, which is open throughout and has no bottom. In Figs. 3 and 4 the brush water-chamber B is shown as obtained by means of an inward-extending portion $b'$ of the outer wall of the paste-holder A' and a portion $c$ of the wall of the pot. Still another way of obtaining the brush water-chamber is represented in Figs. 5 and 6, where it is shown as most largely obtained by an outward extension of the wall $c'$ of the pot A, the inner wall of the brush water-chamber being provided by a portion of the wall of the paste-holder A'.

The section A of the jar or pot may be made of glass, porcelain, earthenware, metal, wood, or any other suitable or desirable material. It has a chamber $c^2$ of a size to receive and inclose upon its bottom and sides the paste-holding section A'. It preferably is enough larger than the paste-holding section to provide a water-holding chamber D about it and beneath it, if desired, and which is a continuation of the brush water-chamber B. It preferably has extending upward from its bottom the rests $c^3$, upon which the paste-holding section A' is supported in order that the water-holding capacity of the water-chamber may be increased, and this construction is especially desirable when the paste-holding section A' has the brush water-chamber B, formed centrally, as represented in Figs. 1 and 2. The jar or holder A may have means for holding the paste-holding part A' away from the wall of the outer section A, and thus provide a water-holding chamber entirely around it.

In use the chamber of the section A is partly filled with water. The paste-holding section A' is placed in it, and this causes the water to rise in the brush water-chamber B and in the water-chamber D to or very nearly to the top of the section. The outer section may also have a cover $c^5$, adapted to cover the paste-holder, brush water-holder, and its extensions, and this holder may be attached thereto in any desired way—for example, by a screw-thread or by some form of bayonet-joint. Where the structure shown in Figs. 3 and 4 is used, in which the position of the brush limits the movement of the cover in either direction, a section of a quick screw-thread or a bayonet-joint is a convenient means for this purpose. In the cover is a hole $d$, through which the handle $d'$ of the paste-brush $D'$ extends when the cover is used for closing the pot.

A brush water-chamber which serves also as an evaporating water-chamber may be alone employed. I prefer the construction which provides the brush water-chamber with lateral extensions for forming an additional evaporating water-chamber adjacent to the paste-holder.

It will be understood that the paste-holding section $A'$ and its cover form a commercial article of sale which may be marketed independently of the outer section A, if desired. It will also be understood that the two sections A and $A'$ coöperate to make the complete brush water-chamber and that the placing of the paste-holder in the partially-water-filled chamber of the outer section A causes by displacement the level of the water to be lifted in the chamber and the brush water-chamber.

While I have referred to the invention as a "paste-holding jar or pot," I would not be understood as limiting it to its use as a holder of and using device for paste alone, for it may be employed in holding and supplying any other composition which requires to be marketed, held and treated in the manner herein indicated.

In Fig. 7 I have shown a construction of paste pot or jar which has a means for varying at will the level of the water in the evaporating-chamber or in the brush-chamber, or both, and I have used for accomplishing this purpose the paste-holder, although I do not limit myself to its use for obtaining the desired result.

In the drawings the paste-holder of the type of Figs. 1 and 2 is illustrated, having instead of the cylindrical wall $b$, open at both ends, a similar wall which has a screw-thread $g$. This threaded section of the paste-holder screws upon a hollow post $g'$, integral with or fixed to the bottom of the pot and which has its cavity $g^2$ connected with the chamber B by one or more inlets $g^3$ at or near its bottom. The paste-holder screws on this hollow threaded post in the chamber B and is lifted or depressed in the chamber as it is screwed and is held by it in any position to which it may be moved. If, for instance, the chamber B is provided with water and the paste-holder is mounted upon the upper end of the post and screwed downward into the chamber, it will cause the water to be displaced and to rise in the cavity of the hollow post and also in the evaporation-chamber B about the paste-holder. The chamber of the hollow post then serves as the brush water-chamber, being open at its top, and as the water is used or becomes evaporated its level may be reëstablished or maintained by the displacement at will caused by the downward movement of the paste-holder in the water-chamber. Of course the holder may be firmly held to the paste-pot or to the wall of the paste-pot with sufficient stress to remain in the position to which it is moved for the purpose of displacing the water.

While I have illustrated the employment of a holder for feeding the evaporating-chamber and the brush-chamber by water displacement at will, I do not confine myself, of course, to obtaining such displacement by use of the holder.

In Fig. 8 the cover $c^5$ is represented as imperforate and provided with a dome to cover the handle of the brush.

Having thus fully described my invention, I claim and desire to secure by Letters Patent of the United States—

1. A paste pot or jar in two independent sections, one contained within the other, the inner section being adapted to hold paste or the like, and the two sections being shaped with respect to each other substantially as shown and described, whereby there is formed between them a water-evaporating chamber and a brush-holding chamber, all as and for the purposes set forth.

2. A paste pot or jar in two independent sections, one contained within the other, the inner section being adapted to hold paste or the like, the two sections being shaped substantially as shown and described, whereby there is formed between them a brush-holding chamber and a water-feeding chamber, said jar having a suitable cover adapted to form with the wall of said inner section a passage whereby moisture from the chamber about said inner section will reach the paste in said inner section, as and for the purposes set forth.

3. A paste pot or jar in two sections, one of which holds paste and is located within the other section, its outer wall being adapted to form with the inner wall of said outer section a water-chamber, a brush-chamber also formed by the outer wall of said paste-chamber and the inner wall of said water-chamber adapted to be fed with water from said water-chamber, as and for the purposes described.

4. The paste pot or jar above described, provided with a paste-section and a water-section, said paste-section being located within said water-section and shaped as shown to form a brush water-chamber adapted to receive water from said water-chamber, said water-chamber also serving to provide a water-evaporating surface for said paste-chamber, as described.

5. A paste pot or jar in two sections, one of which holds paste and the other of which holds water, the paste-section resting on the bottom of said water-section and movable vertically at will with respect thereto to vary the water-level, and both of said sections being open at the top whereby communication may be established between them for the passage of moisture from said water-section to said paste-section, as described.

6. A paste pot or jar in two sections, an outer part adapted to hold water, the inner part adapted to be supported thereby and to hold paste, a brush water-chamber located between the outer wall of said inner part and the inner wall of said outer part and connected with the chamber between said parts, one of said parts being movable at will vertically to vary the water-level in the water-chamber, said water-section and said paste-section being provided with means of communication between the two whereby moisture from the water-section will reach said paste-section, as described.

7. A paste pot or jar in two sections, said inner section being adapted to rest upon the bottom of said outer section, and said sections having engaging threads by which one of said sections is moved vertically with relation to the other, and is also held, said inner section being adapted to receive paste and said outer section to receive water whereby the level of the water in said outer section may be adjusted with relation to the upper edge of said inner section, said outer section and said inner section being connected, as described, whereby there will be a passage for moisture from said water-section to said paste-section, for the purposes set forth, as described.

FREEBORN F. RAYMOND, 2D.

In presence of—
J. M. DOLAN,
SAUL SIPPUSTEIN.